United States Patent Office 3,390,152
Patented June 25, 1968

3,390,152
9,10-ALKOXY-3-ALKYL-2,2-(DITHIOSUB-STITUTED)-BENZOQUINOLIZINES
Michael Raymond Harnden, Waukegan, Ill., assignor to Abbott Laboratories, North Chicago, Ill., a corporation of Illinois
No Drawing. Filed Oct. 21, 1965, Ser. No. 500,228
5 Claims. (Cl. 260—286)

ABSTRACT OF THE DISCLOSURE 3,9,10-trisubstituted 1,2,3,4,6,7-hexahydro-11b-H-benzo[a]quinolizines carrying sulfur containing functions in the 2-position are described. These compounds and their non-toxic salts are active tranquilizers and useful in the treatment of anxiety.

---

The present invention is directed to new compounds in the benzoquinolizine series. In particular it is directed to 3,9,10-trissubstituted 1,2,3,4,6,7 - hexahydro-11b-H-benzo[a]quinolizines carrying two sulfur containing functions in the 2-position and having the general formula

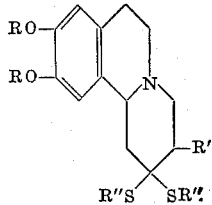

wherein each R is a saturated alkyl group of 1–7 carbon atoms, or both R groups together may be a methylene group, R' is a branched or linear loweralkyl of 1–7 carbon atoms or a N,N-diloweralkylcarboxamido group, and each R" is a saturated or unsaturated loweralkyl group, a hydroxyloweralkyl group, a carboalkoxyloweralkyl group or an aryl group, and the acid addition salts of these organic bases.

The compounds of this invention are made from analogous 3,9,10-substituted-2-ketobenzo[a]quinolizines, which are described in British Patent 789,789. The new compounds and particularly their non-toxic acid addition salts are active as tranquilizers and are particularly useful in the treatment of anxiety. They can be administered by the oral, intraperitoneal, intramuscular or intravenous route to warm-blooded animals. When administered intraperitoneally to rats at a dose of 50 mg./kg. the compounds show outstanding activity in blocking conditioned avoidance responses which can be directly correlated with anti-anxiety effects. In addition, the compounds have low toxicity as supported by tests showing that, for example, the hydrochloride of the compound of the above formula wherein each R is methyl, R' is isobutyl and each R" is methyl, has an oral $LD_{50}$ of about 1000 mg./kg. and an intraperitoneal $LD_{50}$ of about 400 mg./kg. in mice. Other salts of the above series have similarly low toxicities: in all instances tested, the oral $LD_{50}$ in mice were found to be above 400 mg./kg., and frequently above 1000 mg./kg.

The process for preparing the new compounds is demonstrated by the following examples which are illustrations only and are not meant to limit the invention in any respect.

Example 1.—2,2-dimethylthio-3-isobutyl-9,10-dimethoxy-1,2,3,4,6,7 - hexahydro - 11b-H-benzo[a]quinolizine hydrochloride The amount of 2-oxo-3-isobutyl-9,10-dimethoxy-1,2,3,4,6,7 - hexahydro-11b-H-benzo[a]quinolizine hydrochloride obtained from 3 g. of the free base, is dissolved in 100 ml. of ethanol saturated with hydrochloric acid gas. To this solution, 10 ml. of methane thiol is added and the solution is allowed to stand at room temperature for 18 hrs. before being evaporated under reduced pressure. The solid residue is treated with 20 ml. of water, filtered and dried to yield 2.7 g. of 2,2-dimethylthio-3-isobutyl-9,10-dimethoxy-1,2,3,4,6,7 - hexahydro-11b-H-benzo[a]-quinolizine hydrochloride (66.1% of theory) melting at 220–6° C. The pure compound, obtained by recrystallization from methanol/ether melts at 226–7° C.

When replacing 2-oxo-3-isobutyl-9,10-dimethoxy-1,2,3,4,6,7 - hexahydro - 11b - H-benzo[a]quinolizine hydrochloride with the corresponding 9,10-methylenedioxy analogue, 2,2-dimethylthio-3-isobutyl-9,10 - methylenedioxy-1,2,3,4,6,7 - hexahydro-11b - H-benzo[a]quinolizine hydrochloride is obtained in a similar yield. When the starting material carries heptoxy-groups in the 9- and 10-positions, the same procedure results in 2,2-dimethylthio-3-isobutyl-9,10-diheptoxy - 1,2,3,4,6,7 - hexahydro-11b-H-benzo[a]quinolizine hydrochloride.

Examples 2–9

The following table shows a variety of products made according to the method described in Example 1 with the obvious changes in the starting materials used. In this table, the column headed by "each A" refers to the substituent R" of the generic formula shown above. The terms Me and Et used in this table refer to methyl and ethyl respectively.

|   | R(9) | R(10) | R' | Each A | M.P., ° C. | Yield, percent |
|---|------|-------|----|--------|-----------|----------------|
| 2 | —Me | —Me | —CH₂CHMe₂ | —Et | 219–21 | 98 |
| 3 | —Me | —Me | —CH₂CHMe₂ | —(CH₂)₃Me | 171–73 | 78 |
| 4 | —Me | —Me | —CH₂CHMe₂ | —CH₂CH=CH₂ | 143–45 | 74 |
| 5 | —Me | —Me | —CH₂CHMe₂ | (phenyl) | 216–18 | 46 |
| 6 | —Me | —Me | —CH₂CHMe₂ | —CH₂CH₂OH | 217–19 | 30 |
| 7 | —Me | —Me | —CH₂CHMe₂ | —CH₂OCOEt | 218–20 | 42 |
| 8 | —Me | —Me | —CONEt₂ | —Me | 197–200 | 99 |
| 9 | —Me | —Me | —CONEt₂ | —Et | 177–79 | 86 |

It will be obvious to those skilled in the art that other alkyl groups may replace those indicated above for the 3-, 9- and 10-positions, e.g., saturated loweralkyl groups of 1-7 carbon atoms may be attached to the oxygen functions at the 9- and 10-positions and branched or linear alkyl groups may be attached to the ring in the 3-position.

While the above table refers to the melting points of hydrochloric acid salts, it will be apparent that other acid addition salts can be made in a similar fashion. Of these the non-toxic salts such as the sulfuric, phosphoric, acetic and tartaric acids, are of more significant importance since they can be directly used as tranquilizers or anti-anxiety drugs. However, other salts are equally useful in that they can serve as intermediates for the preparation of non-toxic salts. The non-toxic acid addition salts are thus the preferred embodiments of the present invention, particularly since they are better soluble in the useful pharmaceutical vehicles. The free bases are only sparingly soluble in water but exhibit good solubility in various organic solvents such as alcohols. The acid addition salts are also more stable than the free bases which are unstable in alkaline solutions.

Others may practice the invention in any of the numerous ways which will be suggested to one skilled in the art by the present disclosure. All such practice of the invention is considered to be a part hereof provided it falls within the scope of the appended claims.

I claim:
1. A compound of the formula

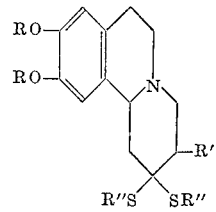

wherein each R is a loweralkyl group or wherein both R groups together are the methylene group, R' is a branched or linear loweralkyl group and each R'' is an unsaturated loweralkyl, saturated loweralkyl, hydroxyloweralkyl, carbalkoxyloweralkyl, or phenyl, and pharmaceutically-acceptable acid addition salts thereof.

2. The compounds of claim 1 wherein each R is methyl, R' is isobutyl and each R'' is loweralkyl.

3. The compound of claim 2 wherein each R'' is methyl.

4. The compounds of claim 1 wherein both R groups together are the methylene group, R' is isobutyl and each R'' is methyl.

5. Acid addition salts of the compounds of claim 1 wherein said acid is hydrochloric acid.

References Cited

UNITED STATES PATENTS 3,105,079  9/1963  Tretten _____ 260—286

NICHOLAS S. RIZZO, *Primary Examiner.*

D. G. DAUS, *Assistant Examiner.*